US008654879B2

(12) United States Patent
Gao et al.

(10) Patent No.: US 8,654,879 B2
(45) Date of Patent: Feb. 18, 2014

(54) MULTI-ANTENNA CHANNEL ESTIMATION METHOD BASED ON POLYPHASE DECOMPOSITION

(75) Inventors: Xiqi Gao, Jiangsu (CN); Wenjin Wang, Jiangsu (CN); Ting Li, Jiangsu (CN); Meili Zhou, Jiangsu (CN); Bin Jiang, Jiangsu (CN); Wen Zhong, Jiangsu (CN); Long Qin, Jiangsu (CN)

(73) Assignee: Southeast University (CN)

(*) Notice: Subject to any disclaimer, the term of this patent is extended or adjusted under 35 U.S.C. 154(b) by 161 days.

(21) Appl. No.: 13/387,308

(22) PCT Filed: Nov. 2, 2010

(86) PCT No.: PCT/CN2010/078319
§ 371 (c)(1),
(2), (4) Date: Jan. 26, 2012

(87) PCT Pub. No.: WO2011/054279
PCT Pub. Date: May 12, 2011

(65) Prior Publication Data
US 2012/0121048 A1    May 17, 2012

(30) Foreign Application Priority Data
Nov. 5, 2009   (CN) .......................... 2009 1 0185344

(51) Int. Cl.
*H04B 7/02*    (2006.01)
(52) U.S. Cl.
USPC ........... 375/267; 375/260; 375/262; 375/295; 375/316; 375/340
(58) Field of Classification Search
USPC ......... 375/219, 223, 259, 260, 261, 267, 268, 375/271, 295, 298, 302, 316, 340, 343, 346
See application file for complete search history.

(56) References Cited

U.S. PATENT DOCUMENTS 6,975,666 B2 * 12/2005 Affes et al. ................... 375/130
7,889,808 B2 *  2/2011 Prasad et al. .................. 375/267
(Continued)

FOREIGN PATENT DOCUMENTS

| CN | 1925471 | 3/2007 | ............. H04L 25/02 |
| CN | 101252555 | 8/2008 | ............. H04L 25/02 |

(Continued)

OTHER PUBLICATIONS

International Search Report, dated Mar. 3, 2011 (3 pgs).

*Primary Examiner* — Hirdepal Singh
(74) *Attorney, Agent, or Firm* — Hayes Soloway P.C.

(57) ABSTRACT

A multi-antenna channel estimation method based on polyphase decomposition includes: receiving frequency domain received signals transformed using discrete fourier transformation (DFT) in pilot symbols; performing phase correction on the frequency domain received signals; performing polyphase decomposition on the frequency domain received signals which are corrected using phase correction and acquiring polyphase signals; performing interpolation on the polyphase signals and acquiring the estimation values of the multi-antenna channel parameters with various linear combinations on each frequency; acquiring decorrelation array based on the pilot structure of the transmission antenna and decorrelating the estimation values of the multi-antenna channel parameters with various linear combination on each frequency using the decorrelation array and acquiring channel parameters of the pilot symbols on each frequency; acquiring channel parameters of data symbols based on the channel parameters of the pilot symbols. With the present invention, the inversion problem in multi-antenna channel estimation is avoided with lower complexity, and results of the multi-antenna channel estimation method become more accurate since the DFT and filtering are performed in the interpolation after polyphase decomposition.

8 Claims, 2 Drawing Sheets

(56) References Cited

U.S. PATENT DOCUMENTS

| | | | |
|---|---|---|---|
| 8,290,096 B2 * | 10/2012 | Shim et al. | 375/341 |
| 8,488,724 B2 * | 7/2013 | Daneshrad et al. | 375/346 |
| 2008/0062859 A1 * | 3/2008 | Le Saux et al. | 370/210 |
| 2009/0103666 A1 * | 4/2009 | Zhao et al. | 375/341 |
| 2009/0296563 A1 * | 12/2009 | Kishiyama et al. | 370/210 |
| 2010/0046681 A1 * | 2/2010 | van Nee | 375/347 |
| 2012/0093176 A1 * | 4/2012 | Siohan et al. | 370/497 |
| 2013/0188677 A1 * | 7/2013 | Howard et al. | 375/219 |

FOREIGN PATENT DOCUMENTS

| | | | |
|---|---|---|---|
| CN | 101267421 | 9/2008 | H04L 25/02 |
| CN | 101707582 | 5/2010 | H04B 7/02 |

* cited by examiner

MULTI-ANTENNA CHANNEL ESTIMATION METHOD BASED ON POLYPHASE DECOMPOSITION

FIELD OF THE INVENTION

The present invention relates to the communication field, particularly, it relates to a channel estimation method.

BACKGROUND OF THE INVENTION

To meet the increasing demand of future mobile communication systems for system capacity, spectrum utilization, and data transmission rate, etc., in the existing LTE (Long Term Evolution) standard, MIMO (Multiple Input Multiple Output) technique and OFDM (Orthogonal Frequency Division Multiplexing) technique are employed. Wherein, the MIMO technique can double or even triple the system capacity and spectrum utilization without increasing the bandwidth. On the other hand, the OFDM technique is a typical technique applied in wideband transmission, and it has many advantages, including high resistance to multi-path fading, insensitivity to narrow-band interference and noise, and flexible bandwidth expansion, etc.

In wireless communication systems, the coherent detection technique is currently employed to achieve better receiving performance. Since channel parameters must be obtained to accomplish coherent detection, the channel estimation must be performed at the receiving end. In order to estimate the channel parameters timely and accurately, a pilot symbol assisted channel estimation method is currently employed in the actual communication systems. In MIMO systems, the multiple channel parameters must be estimated for each receiving channel; In OFDM systems, the channel parameter to be estimated usually indicates the frequency response parameter of channel.

There are a variety of channel estimation methods for MIMO systems which employ code division pilot on the same time-frequency resource. In the existing channel estimation methods, the accurate estimation of channel parameters always involves the complex matrix operations, such as large-dimension matrix inversion; such complex matrix operations will bring huge load on the entire communication system and degrade the processing speed of the system. To solve the above problems, the present invention proposes a channel estimation method, which utilizes polyphase extraction and decorrelation methods to reduce the order of complexity in the implementation of the MIMO channel estimation method, and the discrete cosine transform and filtering methods are employed for interpolation after polyphase extraction so as to improve the accuracy of the MIMO channel estimation method.

SUMMARY OF THE INVENTION

Technical Problem

The present invention provides a MIMO channel estimation method based on polyphase decomposition to overcome the drawbacks of the prior art, such as poor performance and high complexity of the MIMO channel estimation. The method provided in the present invention utilizes polyphase decomposition, interpolation, and decorrelation, etc., and avoids inversion operations in the MIMO channel estimation at a lower order of complexity, and thereby improves the performance of the MIMO channel estimation.

Technical Scheme

In the embodiments of the present invention, a MIMO channel estimation method based on polyphase decomposition is provided, and the method comprises:
a. receiving frequency domain receiving signals at the pilot symbols processed through discrete Fourier transformation;
b. performing phase correction for the frequency domain receiving signals;
c. performing polyphase decomposition for the frequency domain receiving signals treated by the phase correction to obtain polyphase signals;
d. performing interpolation for the polyphase signals to obtain estimated values of different linear combinations of the MIMO channel parameters at the frequency points;
e. obtaining the decorrelation matrix according to the pilot structure of the transmitting antenna, and utilizing the decorrelation matrix to perform decorrelation for the estimated values of different linear combinations of the MIMO channel parameters at the frequency points to obtain the channel parameters of the pilot symbols at the frequency points;
f. obtaining the channel parameters at the data symbols according to the channel parameters at the pilot symbols.

The procedure of phase correction for the frequency domain receiving signals comprises:

Performing the phase correction for the frequency domain receiving signals with a known fundamental sequence of pilot symbols, wherein, the amplitude of pilot symbols is normalized, and the vector of receiving signals treated by phase correction is $\tilde{y} = \bar{X}^H y$,
wherein, $\bar{X} = \mathrm{Diag}\{\bar{x}\}$, $\bar{x}$ represents the vector of the fundamental sequence of pilot symbols, $\mathrm{Diag}\{\bullet\}$ represents a diagonal matrix that takes the vector in the curly brackets as the diagonal elements, $(\;)^H$ represents the conjugate transposition of the matrix, $y = [y_1, y_2, \ldots, y_{N_b}]^T$ represents the frequency domain receiving signals, $y_k$ represents the element k of the signal vector y, i.e., it represents the receiving signal at the frequency point k, $k=1, \ldots, N_b$, $N_b$ represents the number of pilot symbols and data symbols in the frequency domain direction, and $(\;)^T$ represents the transposition of the matrix.

The procedure of performing polyphase decomposition for the receiving signals processed through the phase correction to obtain polyphase signals comprises:

The polyphase decomposition is to decompose the vector $\tilde{y}$ of receiving signals after phase correction into $\bar{P}$ groups of polyphase signals, starting from the frequency point $\bar{P}$ before the vector with an extraction interval $\bar{P}$, wherein, the polyphase signal vector in group p is $s_p$, Wherein, $s_p = [s_{p,1}, s_{p,2}, \ldots, s_{p,N}]^T$, $s_{p,i} = \tilde{y}_{i'}$, $i=1, 2, \ldots, N$, $i'=(i-1) \times \bar{P} + p$, $\bar{P} = P/\mathrm{GCD}(n_2, \ldots, n_{N_T}, P)$, $n_i$ represents the cyclic time shift address of the transmitting antenna pilot i, P represents the number of the cyclic time shifts that are supported by the system at an equal interval, $N_T$ represents the number of transmitting antennae, and $\mathrm{GCD}(\bullet)$ represents the greatest common divisor of all elements in the brackets.

The procedure of the interpolation for the polyphase signals comprises:

Performing spline interpolation separately for each group of the polyphase signals, or performing linear interpolation separately for each group of the polyphase signals, or performing interpolation separately for each group of polyphase signals by means of discrete cosine transformation and filtering so as to obtain the estimated value of linear combination of the MIMO channel parameters at the frequency points corresponding to each polyphase signal.

The procedure of interpolation by discrete cosine transformation and filtering comprises:

5a. performing discrete cosine transformation for each group of the polyphase signal vectors: and the discrete cosine transformation utilizes type II discrete cosine transformation with the following transformation matrix:

$$[C_N^{II}]_{k,l} = w_k \cos\frac{\pi(k-1)(l-0.5)}{N}, l = 1, 2, \ldots, N$$

$$w_k = \begin{cases} 1/\sqrt{N} & k = 1 \\ \sqrt{2}/\sqrt{N} & k \neq 1 \end{cases}$$

Wherein, $C_N^{II}$ is type II discrete cosine transformation matrix in length N, N is the number of frequency points contained in each group of the polyphase signals, k, l, and w are intermediate variables;

After performing the discrete cosine transformation for each group of the polyphase signal, the obtained signal vector in the discrete cosine transformation domain is $s_p^D = C_N^{II} s_p$;

5b. performing single-point filtering for the signal vector after transformation: performing single-point filtering for the signal vector in the discrete cosine transformation domain to obtained the filtered signal vector $\tilde{s}_p = \Gamma_p s_p^D$, Wherein, $\Gamma_p$ is the single-point filtering matrix corresponding to the polyphase signal p, and it is a $N_b \times N_b$ diagonal matrix; if the statistical information of the signal vector in the discrete cosine transformation domain is known, the diagonal element k in the single-point filtering matrix $\Gamma_p$ can be denoted as:

$$[\Gamma_p]_{k,k} = \frac{E\{|s_{p,k}^D|^2\} - \sigma_z^2}{E\{|s_{p,k}^D|^2\}}, k = 1, 2, \ldots, N_b$$

Wherein, $s_{p,k}^D$ represents the element k of vector $s_p^D$, E{ } represent the operation of expectation, | |² represents the square of the absolute value, $\sigma_z^2$ represents noise variance, and $N_b$ represents the number of pilot symbols and data symbols in the frequency domain direction;

If the statistical information of the signal vector in the discrete cosine transformation domain is unknown, the single-point filtering matrix $\Gamma_p$ is the identity matrix of $N_b \times N_b$;

5c. performing extended inverse discrete cosine transformation and mapping for the filtered signal vector to obtain the estimated values of linear combination of the MIMO channel parameters corresponding to each polyphase signal at the frequency points; wherein, the extended inverse discrete cosine transformation and mapping for the filtered signal vector comprises:

The vector of estimated values of the linear combination of the MIMO channel parameters corresponding to the group p of polyphase signals at the frequency points can be denoted as $$\tilde{s}_p = \Lambda_p \underline{C} \tilde{s}_p^D,$$

wherein, $\Lambda_p$ is the $N_b \times (N_b + \bar{P} - 1)$ mapping matrix corresponding to polyphase signal p, and C represents the extended inverse discrete cosine transformation matrix, $$\Lambda_p = \text{Diag}\left\{\underbrace{0, \ldots, 0}_{p-1\uparrow}, \underbrace{1, 1, \ldots, 1}_{N_b\uparrow}, \underbrace{0, \ldots, 0}_{\bar{P}-p\uparrow}\right\}$$

$$[\underline{C}]_{k,l} = w_l \cos\left(\pi(l-1)\left(\frac{k-\bar{P}}{N_b} + \frac{1}{2N}\right)\right)$$

$$w_l = \begin{cases} 1/\sqrt{N} & l = 1 \\ \sqrt{2}/\sqrt{N} & l \neq 1, \end{cases}$$

$$l = 1, 2, \ldots, N, k = 1, 2, \ldots, N_b + \bar{P} - 1,$$

Wherein, w, l, and k are intermediate variables, the estimated values of different linear combinations of the MIMO channel parameters at the frequency points can be denoted in the form of a matrix: $\tilde{S} = [\tilde{s}_1, \tilde{s}_2, \ldots, \tilde{s}_{\bar{P}}]$.

The procedure of obtaining the decorrelation matrix on the basis of the pilot structure of the transmitting antenna comprises:

Calculating the decorrelation matrix U according to the periodicity of the cyclic shift vector in the pilot structure of the transmitting antenna:

$$U = \frac{1}{\sqrt{\bar{P}}}[I_{N_T \times N_T}, O_{N_T \times \bar{P}}] \cdot [w_1, w_2, \ldots, w_{N_T}]^*$$

Wherein, $I_{N_T \times N_T}$ represents the identity matrix of $N_T \times N_T$, $O_{N_T \times \bar{P}}$ represents the all-zero matrix of $N_T \times \bar{P}$, $w_i$ represents the cyclic shift vector of the pilot symbols of the transmitting antenna i, and [ ]* represents conjugate operation of the matrix.

The procedure of performing decorrelation for the estimated values of different linear combinations of the MIMO channel parameters at the frequency points with a decorrelation matrix to obtain the channel parameters of the pilot symbols at the frequency points comprises:

Performing decorrelation for the estimated values of different linear combinations of the MIMO channel parameters at the frequency points with a decorrelation matrix U to obtain the estimated values of frequency domain response parameter in the channels of the transmitting antennae, wherein, the estimated value of the frequency domain response parameter in the channel of transmitting antenna i is $\hat{h}_i = \tilde{S} u_i$, wherein, $u_i$ represents the column i of the decorrelation matrix U.

The procedure of obtaining the channel parameters at the data symbols according to the channel parameters at the pilot symbols comprises: obtaining the frequency domain response parameter of the channel at the data symbols by linear interpolation on the basis of the frequency domain response parameter of the channel at the pilot symbols.

Beneficial Effects:

In the MIMO channel estimation method provided in the embodiments of the present invention, the frequency domain receiving signals at the receiving end are polyphase mixed signals due to the cyclic shift characteristic of the pilot in the transmitting antenna, and polyphase decomposition and decorrelation measures are utilized to decrease the order of complexity in the implementation of the MIMO channel estimation method. In addition, the discrete cosine transformation and filtering measures are employed for the interpolation after polyphase decomposition, therefore, the MIMO channel estimation method is more accurate.

BRIEF DESCRIPTION OF THE DRAWINGS

To make clear of the technical schemes in the embodiments of the present invention, the drawings used in the description of the embodiments or the prior art hereunder will be introduced briefly. Apparently, the drawings described below only illustrate some embodiments of the present invention. Those skilled in the art can obtain the drawings of other embodiments on the basis of these drawings without creative work.

DETAILED DESCRIPTION OF THE EMBODIMENTS

To get a better understand of the technical schemes of the present invention, the technical schemes in the embodiments of the present invention hereunder will be described clearly and completely with the reference to the accompanying drawings. Apparently, the embodiments described below are only some embodiments of the present invention, instead of all embodiments of the present invention. Those skilled in the art can obtain other embodiments without creative work on the basis of the embodiments provided here however, all these embodiments shall be deemed as falling into the protected scope of the present invention.

Figure 1:
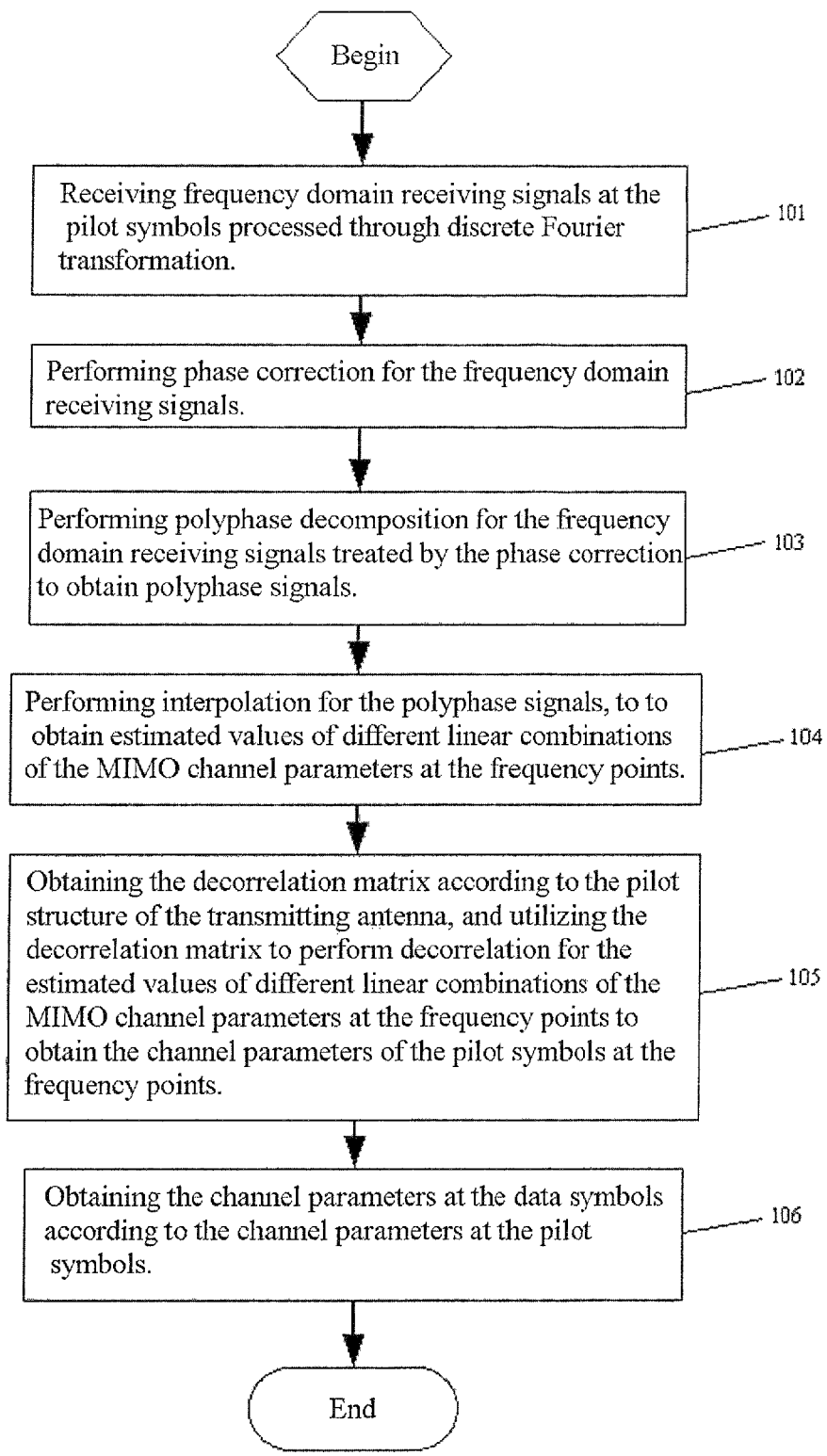
FIG. 1 is the flow diagram of a channel estimation method provided in an embodiment of the present invention.

FIG. 1 shows the flow diagram of a MIMO channel estimation method provided in an embodiment of the present invention, wherein, the method comprises:

101. Receiving frequency domain receiving signals at the pilot symbols processed through discrete Fourier transformation.

In the embodiment of the present invention, the receiving signals at the pilot symbol on the receiving antenna can be treated to remove the cyclic prefix before they are processed through discrete Fourier transformation to obtain frequency domain receiving signals, and the channel estimator can perform further treatment for the frequency domain signals after it receives the frequency domain signals.

102. Performing phase correction for the frequency domain receiving signals.

In the embodiment of the present invention, the amplitude of pilot symbols is normalized, and the receiving end knows the fundamental sequence of the pilot symbols. Therefore, the fundamental sequence of the pilot symbols can be utilized to correct the phase for the receiving signals.

103. Performing polyphase decomposition for the frequency domain receiving signals treated by the phase correction to obtain polyphase signals.

In the embodiment of the present invention, the polyphase decomposition refers to extract several groups of signal vectors from the vector of the frequency domain receiving signals, starting from different frequency points with an equal interval; each group of extracted signal vectors is referred to a group of polyphase signals, and the groups of polyphase signals constitute the polyphase signals.

Decompose the receiving signal vector $\tilde{y}$ of after phase correction into $\overline{P}$ groups of polyphase signals, starting from the frequency point $\overline{P}$ before the vector with an extraction interval $\overline{P}$, wherein, the polyphase signal vector in group p is $s_p$, Wherein, $s_p = [s_{p,1}, s_{p,2}, \ldots, s_{p,N}]^T$, $s_{p,i} = \tilde{y}_{i'}$, $i=1, 2, \ldots, N$, $i'=(i-1)\times\overline{P}+p$, $\overline{P}=P/GCD(n_2, \ldots, n_{N_T}, P)$, $n_i$ represents the cyclic time shift address of the transmitting antenna pilot i, P represents the number of cyclic time shifts that are supported by the system at an equal interval, $N_T$ represents the number of transmitting antennae, and GCD(•) represents the greatest common divisor of all elements in the brackets.

104. Performing interpolation for the polyphase signals to obtain estimated values of different linear combinations of the MIMO channel parameters at the frequency points.

In the embodiment of the present invention, the interpolation is performed separately for each group of the polyphase signals after the polyphase decomposition, and performing the interpolation by means of piecewise linear interpolation or spline interpolation to obtain the estimated values of linear combination of the MIMO channel parameters corresponding to the polyphase signals at the frequency points. Specifically, the vector of estimated values of linear combination of the MIMO channel parameters corresponding to the group p of polyphase signals at the frequency points can be denoted as $\tilde{s}_p = [\tilde{s}_{p,1}, \tilde{s}_{p,2}, \ldots, \tilde{s}_{p,N_b}]^T$, wherein, $\tilde{s}_{p,k}$ represents the estimated value of linear combination of the MIMO channel parameters corresponding to group p of polyphase signals at frequency point k; the estimated values of all linear combinations of the MIMO channel parameters at the frequency points can be denoted in the form of a matrix $\tilde{S} = [\tilde{s}_1, \tilde{s}_2, \ldots, \tilde{s}_{\overline{P}}]$.

105. Obtaining the decorrelation matrix according to the pilot structure of the transmitting antenna, and utilizing the decorrelation matrix to perform decorrelation for the estimated values of different linear combinations of the MIMO channel parameters at the frequency points to obtain the channel parameters of the pilot symbols at the frequency points.

In the embodiment of the present invention, the decorrelation matrix U can be calculated as follows:

$$U = \frac{1}{\sqrt{\overline{P}}} [I_{N_T \times N_T}, O_{N_T \times \overline{P}}] \cdot [w_1, w_2, \ldots, w_{N_T}]^*$$

Wherein, $I_{N_T \times N_T}$ represents the identity matrix of $N_T \times N_T$, $O_{N_T \times \overline{P}}$ represents the all-zero matrix of $N_T \times \overline{P}$, [ ]* represents conjugate operation of the matrix, and $w_i$ represents the cyclic shift vector of the pilot symbols of the transmitting antenna i. Performing decorrelation for the estimated values of different linear combinations of the MIMO channel parameters at the frequency points with a decorrelation matrix U to obtain the estimated values of the frequency domain response parameter in the channels of the transmitting antennae, wherein, the estimated value of the frequency domain response parameter in the channel of the transmitting antenna i is $\hat{h}_i = \tilde{S}u_i$, wherein, $u_i$ represents the column i of the decorrelation matrix U.

106. Obtaining the channel parameters at the data symbols according to the channel parameters at the pilot symbols.

In the MIMO channel estimation method provided in the embodiment of the present invention, the receiving signals at the receiving end is a polyphase mixed signal due to the cyclic shift characteristic of the pilot in the transmitting antenna, and polyphase decomposition, interpolation, and decorrelation measures are utilized. Therefore, the MIMO channel estimation method is more accurate and the order of complexity in implementation is lower.

Figure 2:
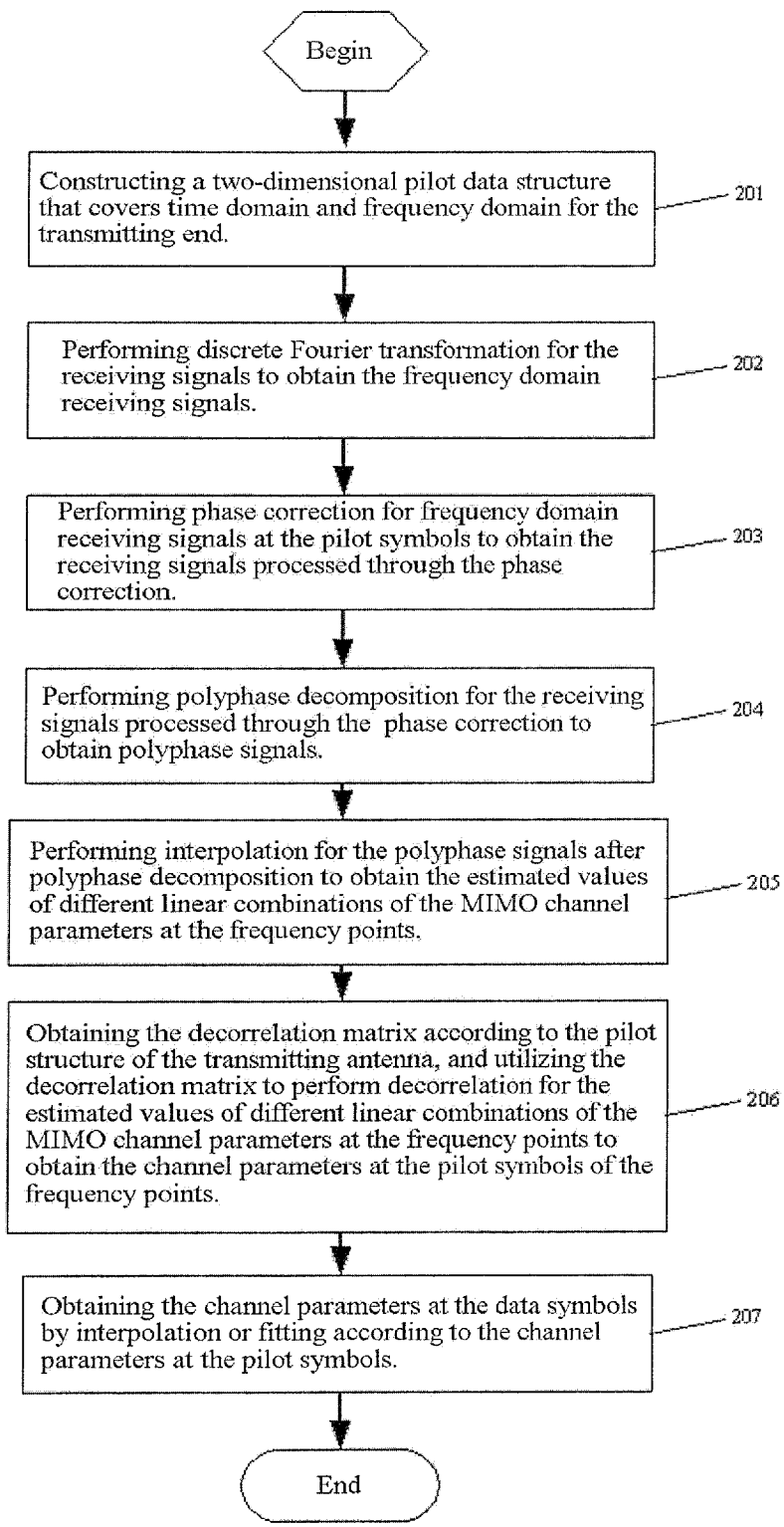
FIG. 2 is the flow diagram of another channel estimation method provided in an embodiment of the present invention.

FIG. 2 shows the flow diagram of another MIMO channel estimation method provided in another embodiment of the present invention. The method can be applied in the scenario of SD-OFDMA (Space Division-Orthogonal Frequency Division Multiple Access) system. In this embodiment, $N_T$ transmitting antennae and $N_R$ receiving antennae are considered. In this case, the transmission channels are MIMO (Multiple Input Multiple Output) channels, so it should be noted that the present invention is not limited to the scenario of MIMO, though the embodiment is described in an example of MIMO channels. Specifically, the channel estimation method can comprise:

201. Constructing a two-dimensional pilot data structure that covers time domain and frequency domain for the transmitting end;

In this embodiment, a two-dimensional pilot data structure is constructed at the transmitting end first. Specifically, a pilot sequence and the arrangement of the pilots can be constructed. In this embodiment, a block-type pilot can be used, wherein, the number of time domain symbols per frame or time slot is $N_s$, the number of pilot symbols in the time domain direction is $N_p$, the length of frequency domain subcarrier is $N_c$, the number of frequency domain subcarriers occupied by pilot symbols and data symbols is $N_b$, and usually $N_b < N_c$. The fundamental sequence of pilot symbols at the transmitting end can be generated from a CAZAC (Constant Amplitude Zero Auto Correlation) sequence, and the pilot sequences of different transmitting antennae can be obtained from different cyclic shifts of the fundamental sequence, in addition, the pilot sequences of different transmitting antennae occupy the same time-frequency resource. Suppose the fundamental sequence of pilot symbol $n_p$ in a frame is $\bar{x}_{n_p}$, then the pilot sequences of all transmitting antennae at the pilot symbol are in the following cyclic shift relation with the fundamental sequence $\bar{x}_{n_p}$ of pilot symbols:

$$\begin{cases} x_{i,n_p} = W_i \bar{x}_{n_p} \\ W_i = \text{Diag}\{w_i\} \\ w_i = [1, e^{j\alpha_i}, e^{j2\alpha_i}, e^{j(N_b-1)\alpha_i}]^T, i = 1, 2, \ldots, N_T \\ \alpha_i = 2\pi n_i / P \end{cases} \quad (1)$$

Wherein, $x_{i,n_p}$ represents the pilot sequence of transmitting antenna i at pilot symbol $n_p$ in a frame, $\text{Diag}\{\cdot\}$ represents a diagonal matrix that takes the vector in the curly brackets as the diagonal elements, and $n_i$ represents the cyclic time shift address of transmitting antenna i, the value range as follows:

$$n_i = \begin{cases} 0 & i = 1 \\ 1, 2, \ldots, P-1 & i = 2, \ldots N_T \end{cases} \quad (2)$$

In addition, if $i \neq j$, then $n_i \neq n_j$ is always true. Under that condition, the pilot sequences of different transmitting antennae are different to each other; P represents the number of cyclic time shifts that supported by the system at an equal interval, $\alpha_i$ represents the cyclic shift factor of transmitting antenna i, $w_i$ represents the cyclic shift vector of pilot of transmitting antenna i, $W_i$ represents the cyclic shift matrix of pilot of transmitting antenna i.

202. Performing discrete Fourier transformation for the receiving signals to obtain the frequency domain receiving signals.

For $N_R$ receiving antennae, there are $N_R$ receiving channels, and for each receiving channel, the frequency domain response parameter of the channel to be estimated is $N_T \times N_b$. At the receiving end, the receiving signal vector of the pilot symbol $n_p$, which is obtained by removing the cyclic prefix of the signal received by receiving channel r and performing discrete Fourier transformation for the signal, can be denoted as:

$$y_{r,n_p} = \Omega^T F_N Y_{r,n_p} = \sum_{i=1}^{N_T} \text{Diag}\{x_{i,n_p}\} \cdot h_{r,i,n_p} + z_{r,n_p} \quad (3)$$

Wherein, $\Omega^T$ represents the inverse mapping matrix of subcarriers, $F_N$ represents the normalized DFT matrix of N×N, N represents the total number of frequency domain subcarriers, $Y_{r,n_p}$ represents the receiving signal vector of receiving antenna r at pilot symbol $n_p$ after the cyclic prefix is removed, and $y_{r,n_p} = [y(r,n_p,1), y(r,n_p,2), \ldots, y(r,n_p,N_b)]^T$, $y(r,n_p,k)$ represents the receiving signals of receiving antenna r at frequency point k at pilot symbol $n_p$, $h_{r,i,n_p}$ represents the column vector composed of the frequency domain response parameter of the channel from transmitting antenna i to receiving antenna r at pilot symbol $n_p$, $z_{r,n_p}$ represents complex Gaussian additive white noise, with the presumption that the mean value of distribution parameter of the additive Gaussian noise is 0, and the variance of the distribution parameter is $\sigma_z^2$. In view that the channel estimation is performed separately from each pilot symbol in each receiving channel, the label $n_p$ and r can be omitted, and thus the formula 3 can be denoted as:

$$y = \sum_{i=1}^{N_T} X_i h_i + z \quad (4)$$

Wherein, $X_i = \text{Diag}\{x_i\}$, the formula (4) represents the basic model of receiving signals in a receiving channel of a pilot band.

203. Performing phase correction for the frequency domain receiving signals at the pilot symbols to obtain the receiving signals processed through the phase correction.

Sending the constructed pilot data structure to the receiving end so that both the transmitting end and the receiving end know the pilot data structure. Since the amplitude of the pilot symbols is normalized, the fundamental sequence of the pilot symbols can be utilized at the receiving end to perform phase correction for the frequency domain receiving signals. Specifically, the receiving signals at the pilot symbols processed through the phase correction can be denoted as:

$$\tilde{y} = \bar{X}^H y = \sum_{i=1}^{N_T} \bar{X}^H X_i h_i + \bar{X}^H z = \sum_{i=1}^{N_T} W_i h_i + \tilde{z} \quad (5)$$

Wherein, $\bar{X} = \text{Diag}\{\bar{x}\}$, $\bar{x}$ represents the vector of fundamental sequence of the pilot symbols, $(\ )^H$ represents the conjugate transposition of the matrix, i.e., $\tilde{z} = \bar{X}^H z$. It can be seen from formula (5), that the elements of receiving signal vector $\tilde{y}$ at each frequency point processed through the phase correction can be represented by the sum of noise items and a linear combination of the frequency domain response parameters of the channels of $N_T$ transmitting antennae at the corresponding frequency point and, whereas each linear combination is determined jointly by all cyclic shift vectors.

204. Performing polyphase decomposition for the receiving signals processed through the phase correction to obtain polyphase signals.

The elements of the receiving signal vector at each frequency point can be represented by the sum of the noise items and a linear combination of the frequency domain response parameter of the channels of all transmitting antennae at the corresponding frequency point. And, the linear combination at each frequency point is determined by all cyclic shift vectors. According to the matrix properties of $W_i$, the linear combination above is not irregular, instead, the vector $W_i$ of the diagonal elements in $w_i$ has periodicity, with a period as $P/GCD(n_i,P)$, wherein, $GCD(\cdot)$ represents the greatest common divisor of all elements in the brackets. Therefore, the linear combination varies periodically over a period $\overline{P}=P/GCD(n_2, \ldots, n_{N_T},P)$ as the variety of the frequency point.

The polyphase decomposition is to decompose the vector $\tilde{y}$ of receiving signals after phase correction into $\overline{P}$ groups of polyphase signals, starting from the frequency point $\overline{P}$ before the vector with an extraction interval $\overline{P}$, wherein, the polyphase signal vector in group p is $s_p$, wherein, $s_p=[s_{p,1}, s_{p,2}, \ldots, s_{p,N}]^T$, $s_{p,i}=\tilde{y}_{i'}$, i=1, 2, ..., N, i'=(i−1)×$\overline{P}$+p, and N=$N_b/\overline{P}$ represents the number of frequency points of the polyphase signals in group p, i and i' are intermediate variables.

205. Performing interpolation for the polyphase signals after polyphase decomposition to obtain the estimated values of different linear combinations of the MIMO channel parameters at the frequency points.

Interpolation is performed separately for each group of the polyphase signals after polyphase decomposition to obtain the estimated values of linear combinations of the MIMO channel parameters corresponding to the polyphase signals at the frequency points. Specifically, the vector $s_p$ of group p of the polyphase signals after the polyphase decomposition only comprises the estimated values of linear combination of the MIMO channel parameters corresponding to the group p of the polyphase signals at frequency points with ID in the collection S, wherein the collection S is defined as:

$$S=\{k|k=(p-1)\bmod \overline{P}+1, 1\leq k \leq N_b\},$$

Interpolation is performed according to the vector $s_p$ of group p of the polyphase signals to obtain the vector $\tilde{s}_p$ of estimated values of linear combination of the MIMO channel parameters corresponding to the group p of the polyphase signals at the rest frequency points. Here, the interpolation can be performed with any method that can be contrived easily, such as linear interpolation, spline interpolation, etc.; in this embodiment, an interpolation method based on discrete cosine transformation and filtering is provided:

Performing Type II discrete cosine transformation for the vector $s_p$ of group p of the polyphase signals after polyphase decomposition to obtain a signal vector $s_p^D = C_N^{II} s_p$ in the discrete cosine transformation domain, wherein, $C_N^{II}$ represents the matrix of Type II discrete cosine transformation, and the elements in the matrix are denoted as follows:

$$[C_N^{II}]_{k,l} = w_k \cos\frac{\pi(k-1)(l-0.5)}{N} \quad k,l=1, 2, \ldots, N \quad (6)$$

$$w_k = \begin{cases} 1/\sqrt{N} & k=1 \\ \sqrt{2}/\sqrt{N} & k \neq 1 \end{cases}$$

Perform filtering for the vector after the transformation. Specifically, single-point filtering can be performed for the signal vector in the discrete cosine transformation domain:

$$\bar{s}_p = \Gamma_p s_p^D \quad (7)$$

Wherein, $\Gamma_p$ is the single-point filtering matrix corresponding to polyphase signal p, and it is a diagonal matrix of $N_b \times N_b$. In this embodiment, different filtering matrixes can also be selected as appropriate according to the actual circumstance:

If the statistical information of the signal vector is known, the diagonal element k in $\Gamma_p$ can be denoted as:

$$[\Gamma_p]_{k,k} = \frac{E\{|s_{p,k}^D|^2\} - \sigma_z^2}{E\{|s_{p,k}^D|^2\}}, k=1, 2, \ldots, N_b \quad (8)$$

Wherein, $s_{p,k}^D$ represents the element k of vector $s_p^D$.

If the statistical information of the channel vector is unknown, then, $\Gamma_p$ is the identity matrix of $N_b \times N_b$.

If the statistical information is known, the noise in the signals after transformation can be removed by single-point filtering. Of course, the filtering method in the embodiments of the present invention is not limited to single-point filtering, which is to say, other types of filtering can also be used. For example, the filtering based on the minimum mean square error criterion can be used, however, such filtering is multi-point filtering corresponding to single point filtering, and the filtering matrix involves matrix inversion operation, therefore, that filtering method is more complex.

Performing extended inverse discrete cosine transformation and mapping for the filtered signal vector to obtain a vector $\tilde{s}_p = \Lambda_p C \bar{s}_p^D$ after discrete cosine interpolation, wherein, C represents the matrix of extended inverse discrete cosine transformation, and the elements in the matrix can be denoted as follows:

$$[C]_{k,l} = w_l \cos\left(\pi(l-1)\left(\frac{k-\overline{P}}{N_b} + \frac{1}{2N}\right)\right) \quad (9)$$

$$w_l = \begin{cases} 1/\sqrt{N} & l=1 \\ \sqrt{2}/\sqrt{N} & l \neq 1' \end{cases}$$

$$l=1, 2, \ldots, N, k=1, 2, \ldots, N_b + \overline{P}+1,$$

Wherein, the matrix $\Lambda_p$ is the $N_b \times (N_b + \overline{P} - 1)$ mapping matrix corresponding to polyphase signal p, and the elements in the matrix can be denoted as follows:

$$\Lambda_p = \text{Diag}\{\underbrace{0, \ldots, 0}_{p-1\uparrow}, \underbrace{1, 1, \ldots, 1}_{N_b\uparrow}, \underbrace{0, \ldots, 0}_{\overline{P}-p\uparrow}\} \quad (10)$$

With the interpolation method described above, the vector of estimated values of linear combination of the MIMO channel parameters corresponding to group p of the polyphase signals at the frequency points can be obtained, and the vector can be denoted as $\tilde{s}_p$. Then the estimated values of different linear combinations of the MIMO channel parameters at the frequency points can be denoted as matrix $\tilde{S}=[\tilde{s}_1, \tilde{s}_2, \ldots, \tilde{s}_{\overline{P}}]$.

206. Obtaining the decorrelation matrix according to the pilot structure of the transmitting antenna. Performing decorrelation for the estimated values of different linear combinations of the MIMO channel parameters at the frequency points with a decorrelation matrix to obtain the channel parameters of the pilot symbols at the frequency points.

Each row of the elements in matrix $\tilde{S}$ are estimated values of different linear combinations of frequency domain response parameter of the MIMO channel at the corresponding frequency point, and the estimated values of different linear combinations of frequency domain response parameter of the MIMO channel can be decorrelated by means of a decorrelation matrix to recover the frequency domain response parameter of the MIMO channel.

The decorrelation matrix U can be calculated as follows:

$$U = \frac{1}{\sqrt{P}} [I_{N_T \times N_T}, O_{N_T \times \overline{P}}] \cdot [w_1, w_2, \ldots, w_{N_T}]^* \quad (11)$$

Wherein, $I_{N_T \times N_T}$ represents the identity matrix of $N_T \times N_T$, $O_{N_T \times \overline{P}}$ represents the all-zero matrix of $N_T \times \overline{P}$, and [ ]* represents conjugate operation of the matrix. Performing decorrelation for the estimated values of different linear combinations of the MIMO channel parameters with a decorrelation matrix U to obtain the estimated values of the frequency domain response parameter in the channels of the transmitting antennae, wherein, the estimated value of the frequency domain response parameter in the channel of transmitting antenna i is:

$$\hat{h}_i = \tilde{S} u_i \quad (12)$$

Wherein, $u_i$ represents the column i in the decorrelation matrix U.

207. Obtaining the channel parameters at the data symbols by interpolation or fitting according to the channel parameters at the pilot symbols.

For example, in this procedure, the channel parameters at the data symbols can be obtained by linear interpolation:

Suppose two adjacent pilots are at pilot symbol $n_1$ and $n_2$ in a frame, the frequency domain response parameter of channel of transmitting antenna i at the pilot symbols is denoted as $\hat{h}_{i,n_1}$ and $\hat{h}_{i,n_2}$, respectively. Then the estimated value of frequency domain response parameter of channel of the transmitting antenna at data symbol n can be denoted as:

$$\hat{h}_{i,n} = \frac{\hat{h}_{i,n_2} - \hat{h}_{i,n_1}}{n_2 - n_1}(n_1 - n) + \hat{h}_{i,n_1} \quad (13)$$

In addition, there are other implementations for obtaining the frequency domain response parameter of the channel at data symbols according to the frequency domain response parameter of the channel at pilot symbols. For example, mean value substitution method can be used.

In the MIMO channel estimation method provided in the embodiments of the present invention, the receiving signals at the receiving end are polyphase mixed signals due to the cyclic shift characteristic of the pilot in the transmitting antenna. Polyphase decomposition and decorrelation measures are utilized to decrease the order of complexity in the implementation of the MIMO channel estimation method. In addition, the discrete cosine transformation and filtering measures are employed for the interpolation after polyphase decomposition, therefore, the MIMO channel estimation method is more accurate.

The embodiments of the present invention can be implemented by software, and the software program can be stored in a readable storage media, such as a hard disk, cache, or CD in a computer.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

The invention claimed is:

1. A MIMO channel estimation method based on polyphase decomposition, comprising:
   a. Receiving frequency domain receiving signals at the pilot symbols processed through discrete Fourier transformation;
   b. Performing phase correction for the frequency domain receiving signals;
   c. Performing polyphase decomposition for the frequency domain receiving signals treated by the phase correction to obtain polyphase signals;
   d. Performing interpolation for the polyphase signals to obtain estimated values of different linear combinations of the MIMO channel parameters at the frequency points;
   e. Obtaining a decorrelation matrix according to the pilot structure of a transmitting antenna, and utilizing the decorrelation matrix to perform decorrelation for the estimated values of different linear combinations of the MIMO channel parameters at the frequency points to obtain the channel parameters of the pilot symbols at the frequency points;
   f. Obtaining the channel parameters at the data symbols according to the channel parameters at the pilot symbols.

2. The MIMO channel estimation method based on polyphase decomposition according to claim 1, wherein, the procedure of phase correction for the frequency domain receiving signals comprises:
   Performing the phase correction for the frequency domain receiving signals with a known fundamental sequence of the pilot symbols, wherein, the amplitude of pilot symbol is normalized, and the vector of the receiving signals treated by phase correction is $\tilde{y} = \overline{X}^H y$,
   wherein, $\overline{X} = \text{Diag}\{\overline{x}\}$, $\overline{x}$ represents the vector of fundamental sequence of the pilot symbols, $\text{Diag}\{\bullet\}$ represents a diagonal matrix that takes the vector in the curly brackets as the diagonal elements, $(\ )^H$ represents the conjugate transposition of the matrix, $y = [y_1, y_2, \ldots, y_{N_b}]^T$ represents the frequency domain receiving signals, $y_k$ represents the element k of the signal vector y, i.e., it represents the receiving signal at the frequency point k, and $k = 1, \ldots, N_b$, $N_b$ represents the number of pilot symbols and data symbols in the frequency domain direction, and $(\ )^T$ represents the transposition of the matrix.

3. The MIMO channel estimation method based on polyphase decomposition according to claim 1, wherein, the procedure of performing polyphase decomposition for the receiving signals processed through the phase correction to obtain polyphase signals comprises:
   The polyphase decomposition is to decompose the vector $\tilde{y}$ of receiving signals after phase correction into $\overline{P}$ groups of polyphase signals, starting from the frequency point $\overline{P}$ before the vector with an extraction interval $\overline{P}$, wherein, the polyphase signal vector in group p is $s_p$,
   wherein, $s_p = [s_{p,1}, s_{p,2}, \ldots, s_{p,N}]^T$, $s_{p,i} = \tilde{y}_{i'}$, $i = 1, 2, \ldots, N$, $i' = (i-1) \times \overline{P} + p$, $\overline{P} = P/\text{GCD}(n_2, \ldots, n_{N_T}, P)$, $n_i$ represents the cyclic time shift address of the transmitting antenna pilot i, P represents the number of cyclic time shifts that are supported by the system at an equal interval, $N_T$ represents the number of transmitting antennae, and $\text{GCD}(\bullet)$ represents the greatest common divisor of all elements in the brackets.

4. The MIMO channel estimation method based on polyphase decomposition according to claim 1, wherein, the procedure of interpolation for the polyphase signals comprises:
  Performing spline interpolation separately for each group of the polyphase signals, or
  performing linear interpolation separately for each group of the polyphase signals, or
  performing interpolation separately for each group of polyphase signals by means of discrete cosine transformation and filtering to obtain the estimated value of linear combination of the MIMO channel parameters at the frequency points corresponding to each polyphase signal.

5. The MIMO channel estimation method based on polyphase decomposition according to claim 4, wherein, the procedure of interpolation by discrete cosine transformation and filtering comprises:
  5a. performing discrete cosine transformation for each group of polyphase signal vectors: the discrete cosine transformation utilizes type II discrete cosine transformation with the following transformation matrix:

$$[C_N^{II}]_{k,l} = w_k \cos \frac{\pi(k-1)(l-0.5)}{N} \quad k, l = 1, 2, \ldots, N$$

$$w_k = \begin{cases} 1/\sqrt{N} & k = 1 \\ \sqrt{2}/\sqrt{N} & k \neq 1 \end{cases}$$

Wherein, $C_N^{II}$ is type II discrete cosine transformation matrix in length N, N is the number of frequency points contained in each group of the polyphase signals, k, l, and w are intermediate variables;
  After performing the discrete cosine transformation for each group of the polyphase signal, the obtained signal vector in the discrete cosine transformation domain is $s_p^D = C_N^{II} s_p$;
  5b. performing single-point filtering for the signal vector after transformation: performing single-point filtering for the signal vector in the discrete cosine transformation domain to obtain the filtered signal vector $\bar{s}_p^D = \Gamma_p s_p^D$,
  Wherein, $\Gamma_p$ is the single-point filtering matrix corresponding to the polyphase signal p, and it is a $N_b \times N_b$ diagonal matrix; if the statistical information of the signal vector in the discrete cosine transformation domain is known, the diagonal element k in the single-point filtering matrix $\Gamma_p$ can be denoted as:

$$[\Gamma_p]_{k,k} = \frac{E\{|s_{p,k}^D|^2\} - \sigma_z^2}{E\{|s_{p,k}^D|^2\}}, k = 1, 2, \ldots, N_b$$

Wherein $s_{p,k}^D$ represents the element k of vector $s_p^D$, E{ } represent the operation of expectation, | |² represents the square of the absolute value, $\sigma_z^2$ represents noise variance, and $N_b$ represents the number of pilot symbols and data symbols in the frequency domain direction;
  If the statistical information of the signal vector in the discrete cosine transformation domain is unknown, the single-point filtering matrix $\Gamma_p$ is the identity matrix of $N_b \times N_b$;
  5c. performing extended inverse discrete cosine transformation and mapping for the filtered signal vector to obtain the estimated values of linear combination of the MIMO channel parameters corresponding to each polyphase signal at the frequency points;
  wherein, the extended inverse discrete cosine transformation and mapping for the filtered signal vector comprise:
  The vector of estimated values of the linear combination of the MIMO channel parameters corresponding to the group p of polyphase signals at the frequency points can be denoted as $\tilde{s}_p = \Lambda_p \bar{C} \bar{s}_p^D$, wherein, $\Lambda_p$ is the $N_b \times (N_b + \overline{P} - 1)$ mapping matrix corresponding to polyphase signal p, and $\bar{C}$ represents the extended inverse discrete cosine transformation matrix, $$\Lambda_p = \text{Diag}\left\{\underbrace{0, \ldots, 0}_{p-1\uparrow}, \underbrace{1, 1, \ldots, 1}_{N_b\uparrow}, \underbrace{0, \ldots, 0}_{\overline{P}-p\uparrow}\right\}$$

$$[\bar{C}]_{k,l} = w_l \cos\left(\pi(l-1)\left(\frac{k-\overline{P}}{N_b} + \frac{1}{2N}\right)\right)$$

$$w_l = \begin{cases} 1/\sqrt{N} & l = 1 \\ \sqrt{2}/\sqrt{N} & l \neq 1 \end{cases}$$

$$l = 1, 2, \ldots, N, k = 1, 2, \ldots, N_b + \overline{P} - 1,$$

Wherein, w, l, and k are intermediate variables, the estimated values of different linear combinations of the MIMO channel parameters at the frequency points can be denoted in the form of a matrix: $\tilde{S} = [\tilde{s}_1, \tilde{s}_2, \ldots, \tilde{s}_{\overline{P}}]$.

6. The MIMO channel estimation method based on polyphase decomposition according to claim 1, wherein, the procedure of obtaining a decorrelation matrix according to the pilot structure of the transmitting antenna comprises:
  Calculating the decorrelation matrix U according to the periodicity of the cyclic shift vector in the pilot structure of the transmitting antenna:

$$U = \frac{1}{\sqrt{\overline{P}}}\left[I_{N_T \times N_T}, O_{N_T \times \overline{P}}\right] \cdot [w_1, w_2, \ldots, w_{N_T}]^*$$

Wherein, $I_{N_T \times N_T}$ represents the identity matrix of $N_T \times N_T$, $O_{N_T \times \overline{p}}$ represents the all-zero matrix of $N_T \times \overline{P}$, $w_i$ represents the cyclic shift vector of the pilot symbols of the transmitting antenna i, and [ ]* represents conjugate operation of the matrix.

7. The MIMO channel estimation method based on polyphase decomposition according to claim 1, wherein, the procedure of performing decorrelation for the estimated values of different linear combinations of the MIMO channel parameters at the frequency points with a decorrelation matrix to obtain the channel parameters of the pilot symbols at the frequency points comprises:
  Performing decorrelation for the estimated values of different linear combinations of the MIMO channel parameters at the frequency points with a decorrelation matrix U to obtain the estimated values of frequency domain response parameter in the channels of the transmitting antennae, wherein, the estimated value of the frequency domain response parameter in the channel of transmitting antenna i is $\hat{h}_i = \tilde{S} u_i$, where, $u_i$ represents the column i of the decorrelation matrix U.

8. The MIMO channel estimation method based on polyphase decomposition according to claim 1, wherein, the procedure of obtaining the channel parameters at the data symbols according to the channel parameters at the pilot symbols comprises: obtaining the frequency domain response parameter of the channel at the data symbols by linear interpolation on the basis of the frequency domain response parameter of the channel at the pilot symbols.

* * * * *

UNITED STATES PATENT AND TRADEMARK OFFICE
CERTIFICATE OF CORRECTION

PATENT NO. : 8,654,879 B2  
APPLICATION NO. : 13/387308  
DATED : February 18, 2014  
INVENTOR(S) : Gao et al.

Page 1 of 1

It is certified that error appears in the above-identified patent and that said Letters Patent is hereby corrected as shown below:

In the Claims:

Claim 5, Col. 13, line 56, "$s_{p,k}{}^{D}$" should be -- $\tilde{s}_{p,k}^{D}$ --.

Claim 5, Col. 14, line 8, "$\tilde{s}_p = A_p \underline{C} \tilde{s}_p^{D}$" should be -- $\tilde{s}_p = A_p \underline{C} \tilde{s}_p^{D}$ --.

Signed and Sealed this  
Twenty-sixth Day of August, 2014

Michelle K. Lee  
*Deputy Director of the United States Patent and Trademark Office*